United States Patent [19]
Frysz et al.

[11] Patent Number: 6,110,622
[45] Date of Patent: Aug. 29, 2000

[54] CHEMICALLY MACHINED CURRENT COLLECTOR DESIGN

[75] Inventors: Christine A. Frysz, East Amherst; Dominick J. Frustaci; Joseph M. Probst, both of Williamsville; William C. Thiebolt, III, Tonawanda; William M. Paulot, Lancaster, all of N.Y.

[73] Assignee: Wilson Greatbatch Ltd., Clarence, N.Y.

[21] Appl. No.: 09/120,526

[22] Filed: Jul. 22, 1998

[51] Int. Cl.[7] .................................................... H01M 4/64
[52] U.S. Cl. ........................ 429/233; 429/242; 429/243; 429/241; 429/231.9; 429/322; 429/323; 429/326
[58] Field of Search ..................... 429/233, 241, 429/242, 243, 245, 231.9, 322, 323, 326, 319, 219, 220, 221, 223, 224, 231.7, 231.8, 232, 231.5

[56] References Cited

U.S. PATENT DOCUMENTS

| | | | |
|---|---|---|---|
| 3,959,016 | 5/1976 | Tsuda | 136/67 |
| 3,989,539 | 11/1976 | Grabb | 429/241 |
| 4,443,918 | 4/1984 | Morinari et al. | 29/3 |
| 4,555,459 | 11/1985 | Anderson et al. | 429/211 |
| 5,276,960 | 1/1994 | Wheadon et al. | 29/623.5 |
| 5,518,839 | 5/1996 | Olsen | 429/192 |
| 5,578,396 | 11/1996 | Fauteux et al. | 429/209 |
| 5,599,435 | 2/1997 | Li et al. | 205/59 |
| 5,721,071 | 2/1998 | Sonobe et al. | 429/218 |
| 5,756,232 | 5/1998 | Kelly et al. | 429/232 |

*Primary Examiner*—Maria Nuzzolillo
*Assistant Examiner*—Angela J. Martin
*Attorney, Agent, or Firm*—Hodgson Russ Andrews Woods & Goodyear LLP

[57] ABSTRACT

A current collector in the form of a conductive substrate subjected to a special chemical etch on both major surfaces to provide a "basket weave" structure, is described. The basket weave structures has a lattice construction surrounded by a frame and comprising first strand structures intersecting second strand structures to provide a plurality of diamond-shaped openings or interstices bordered by the strands. The strand structures intersect or join with each other at junctions thereby forming the current collector as an integral unit.

26 Claims, 7 Drawing Sheets

FIG. 13

CHEMICALLY MACHINED CURRENT COLLECTOR DESIGN

BACKGROUND OF THE INVENTION

1. Field of the Invention

The present invention relates to the conversion of chemical energy to electrical energy. More particularly, the present invention relates to a conductive substrate providing enhanced contact with an electrode active material. The improvement in electrode active contact is provided by chemically machining selected portions of the opposed major surfaces of the conductive substrate. The thusly fabricated substrate is particularly useful as a current collector in an electrochemical cell.

2. Prior Art

Presently, there are many different techniques for fabricating current collectors including subjecting a conductive foil substrate to mechanical expansion and perforating a conductive foil. However, mechanically expanded metal screens and perforated foils often have burrs which are potential contributors to battery shorting. Other typical state-of-the-art current collector designs, such as conventional chemical machining (etching or milling), electrolytic etching, and conductive foils provided with a vapor deposited bonding layer, attempt to increase the contact surface area without altering the generally planar configuration of the substrate workpiece. Maintaining the substrate having a planar surface structure limits the degree to which the contact surface area can be increased. In that respect, foil screen designs limit the variety of active material that can be contacted thereto. For example, adherence of pressed powders or flexible sheets of electrode active material to foil screens is virtually impossible. Finally, conventional woven fabric collectors are limited to minimum thicknesses required to maintain structural integrity. This detracts from improvements in reducing the passive volume of the fabric.

SUMMARY OF THE INVENTION

The present invention is, therefore, directed to a conductive substrate that serves as a current collector having improved contact or intimacy with an electrode active material without the problems characteristic of the various types of prior art collectors. The present current collector is provided by chemically etching a conductive foil to achieve the intimacy attributes of pulled mechanically expanded metal screens without burrs, to provide enhanced surface roughness characteristics that facilitate contact of the current collector with the electrode active material, to allow for support flexibility in selection of electrode material type, and to optimize reduction in the passive current collector material volume.

Thus, it is an object of the present invention to provide a current collector design that achieves increased intimacy between the electrode active material and the collector screen, which in turn yields increased discharge efficiency. When an electrochemical cell containing electrodes built with the present current collector is used to power an implantable medical device such as a cardiac defibrillator, this results in higher pulse voltages, reduced charging times and provides for increased discharge capacity, thereby extending the medical device life.

Another object of the present invention is to provide a current collector design that provides improved rapid delivery of energy capacity and prevents cell premature end of life.

A further object of the present invention is to provide a current collector design that allows enhanced electrode flexibility, facilitating winding into cells having a jellyroll electrode assembly.

Another object of the present invention is to provide a current collector that decreases the volume of the cell's passive parts, thereby increasing the active material content.

Still another object of the present invention is to provide a current collector design that yields thinner finished electrodes facilitating cell assembly, and to provide a current collector design that renders wider use in applications with pulse amplitude requirements, such as implantable medical devices.

Furthermore, another object of the present invention is to provide a current collector that reduces cell internal resistance. The reduction in internal resistance is due to an enhanced intimate contact between the current collector and the supported electrode active material which consequently enables the fabrication of jellyroll electrode assemblies. Such electrode assemblies require less current collector leads in comparison to prismatic electrodes assemblies. The reduction of current collector leads facilitates cell manufacturability by eliminating additional joining operations while enhancing cell reliability.

According to the present invention, these objects are realized by chemically etching selected portions of the opposed major surfaces of the current collector to provide the screen with a "basket weave" configuration.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

Throughout the various embodiments of the present invention, like parts, components, portions or assemblies are assigned like numerical designations.

Turning now to the drawings, FIGS. 1 to 5 show one embodiment of a conductive substrate 10 according to the present invention. The conductive substrate 10 is particularly useful as a current collector in an electrochemical energy storage device and has a generally elongated, rectangular shape provided with a perimeter frame 12 and an integral interior reticulum or grid structure 14 bordered by the frame. Tabs 16, 18 and 20 extend from the frame 12, and in the preferred embodiment of the conductive substrate 10 are integral therewith. However, if desired, the tabs 16, 18 and 20 can be separate parts that are subsequently welded, fused or otherwise secured to the conductive substrate 10 at the frame 12 thereof. The tabs provide for connecting an electrode (not shown) comprising the conductive substrate to a cell terminal. Also, the conductive substrate 10 may have a shape other than the rectangular one shown depending on the construction or configuration of the cell in which the substrate will be incorporated.

Figure 2:
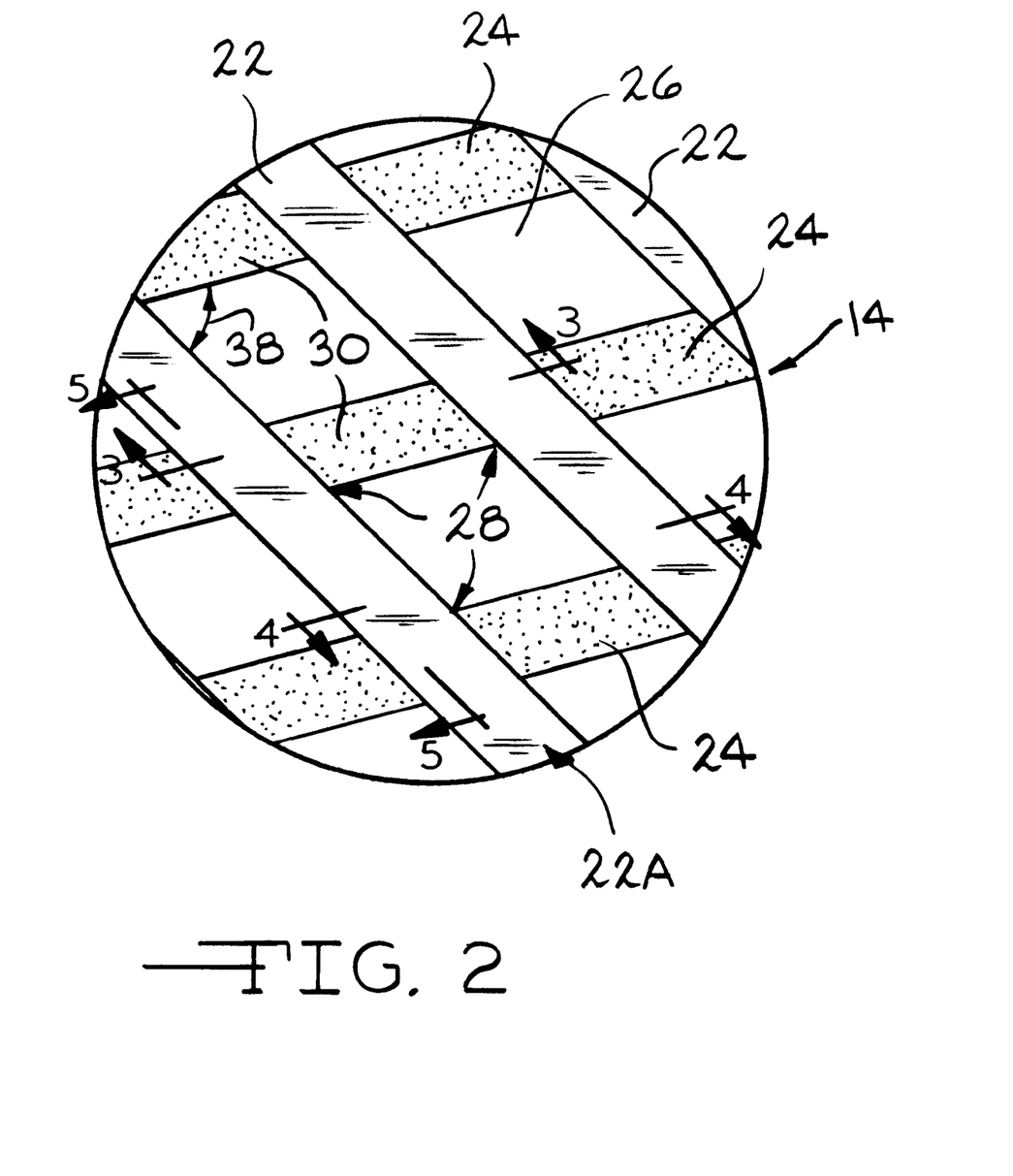
FIG. 2 is an enlarged view of a portion of the grid structure 14 of the conductive substrate 10 shown in FIG. 1.

FIG. 2 is an enlarged view of the grid structure 14 having a lattice construction surrounded by the frame 12 and comprising first strand structures 22 intersecting second strand structures 24 to provide a plurality of diamond-shaped openings or interstices 26 bordered by the strands. The strand structures 22,24 intersect or join with each other at junctions 28 thereby forming the grid structure as an integral unit.

Figure 1:
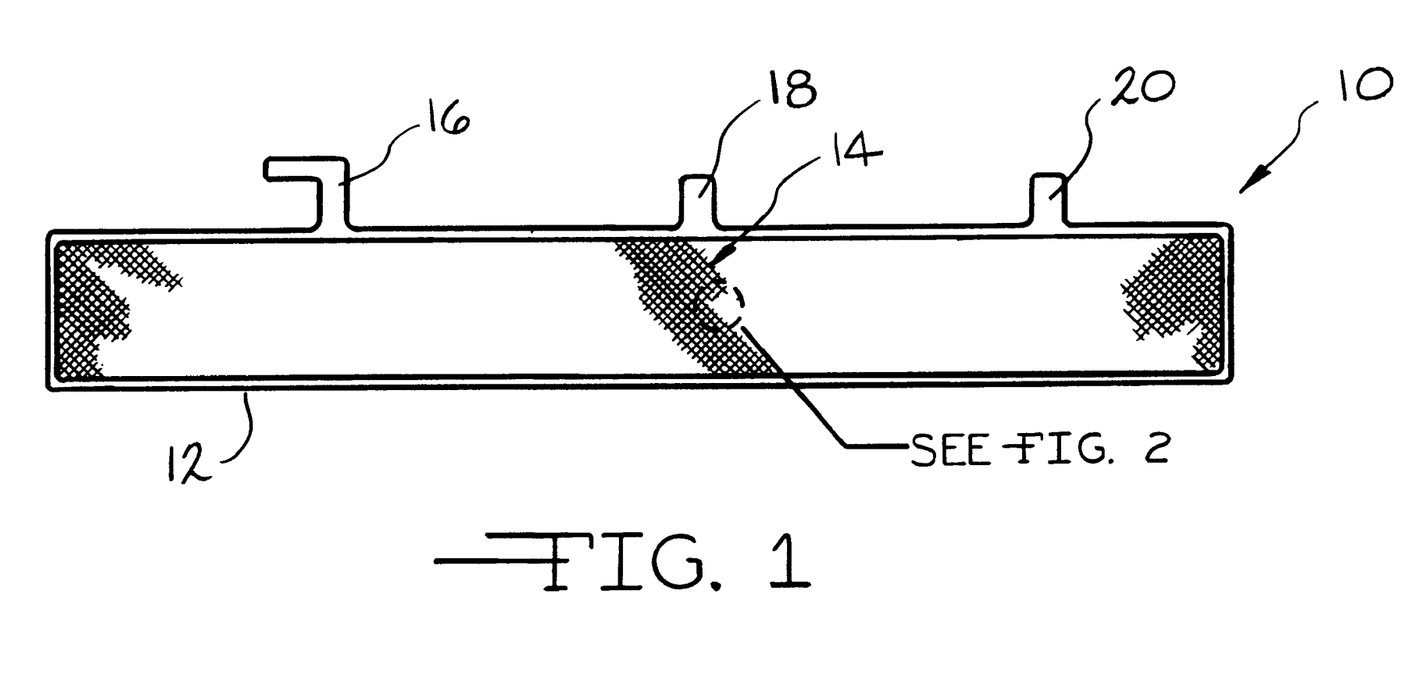
FIG. 1 is a side elevational view of one embodiment of a conductive substrate 10 according to the present invention.

According to the present invention, the grid structure 14 is fabricated by the controlled dissolution or corrosion of a sheet-like or foil shaped workpiece through contact with an etchant in a chemical machining or photochemical machining process. In that respect, the conductive substrate 10 begins as conductive coil stock (not shown) having generally planar opposed major surfaces in an uncoiled, laid flat orientation. The coil stock preferably has a thickness of about 0.001 to about 2 millimeters and is cut into sheets from which a multiplicity of current collectors will subsequently be fabricated in a batch operation. The cut sheets are subjected to a precleaning process such as a chromic acid bath to remove scale and then run through a pumice slurry that serves to render the workpiece sheets having a clean condition, ready for processing after being rinsed and dried.

A dry film resist or mask is then applied to selected portions of each major surface of the workpiece to thereby protect the coated surfaces from the chemical action of the subsequent chemical machining or photochemical machining process. As is well known by those skilled in the art, the protective resist is inert to the etchant compounds, is able to withstand the heat from etching, adheres well to the workpiece and is easily and inexpensively removed after etching. The resist must also be tough enough to withstand handling, rigid enough to prevent drooping when undercut, yet scribe easily or spray cleanly. Numerous synthetic or rubber-base resist materials are available in a wide variety of types and trade names.

To fabricate the conductive substrate 10, the resist is applied to a first major surface of the workpiece in the configuration of the frame 12 and the strand structures 22 and then to a second, opposite major surface of the workpiece in the configuration of the frame 12 and the strand structures 24. Preferably, the resist is applied to the workpiece as a photoresist by a photographic technique. Such a process begins with a photo-sensitive resist applied to the entire area of each major surface of the workpiece followed by air drying or oven baking the resist contacted workpiece. Next, contact printing from a workpiece negative of the to be produced grid structure 14 is followed by photographic development and drying. The workpiece is next moved through an etchant bath or otherwise contacted by the etchant solution such as by spraying. In the case of a titanium workpiece, for example, the etchant comprises a hydrogen fluoride/nitric acid solution. Those skilled in the art will readily recognize etchant solutions that are useful with other conductive substrate materials useful with the present invention such as molybdenum, tantalum, niobium, cobalt, nickel, stainless steel, tungsten, platinum, palladium, gold, silver, copper, chromium, vanadium, aluminum, zirconium, hafnium, zinc and iron, and the like, and mixtures and alloys thereof.

To form the present conductive substrate 10, the workpiece with the applied resist pattern having the shape of the frame 12 surrounding the grid structure 14 is contacted with the etchant for a period of time sufficient to etch away from each major surface a thickness of the workpiece material somewhat greater than one-half the total thickness of the workpiece. That way, those areas not provided with resist on either major surface of the workpiece will be completely removed to provide the diamond-shaped openings 26.

As shown in FIGS. 6 to 9, another embodiment of a conductive substrate 10A according to the present invention comprises a grid structure 14A wherein the workpiece is not contacted with the etchant for a period of time sufficient to completely etch away the material bordered by the frame 12 and the strand structures 22 and 24 to provide the openings 26. Instead, the areas where the openings 26 would reside is thinned or reduced in thickness but not etched completely through to provide substrate portions 29 having a thickness substantially less than that of the workpiece material. Such a construction might be useful when the fabricated workpiece is intended for use as a current collector contacted with an electrode active material in a spray coating process, such as described in U.S. Pat. No. 5,716,422 to Muffoletto et al., which is assigned to the assignee of the present invention and incorporated herein by reference.

After the workpiece has been chemical machined to the desired extent to provide the grid structure 14 (FIGS. 1 to 5) having the diamond-shaped openings 26 bordered by the frame 12 and the first and second strand structures 22 and 24, or to provide the grid structure 14A (FIGS. 6 to 9) having the frame 12 and the strands 22,24 bordering interior substrate portions 29 of a reduced thickness, the resist material is removed in an aqueous stripping solution. After rinsing and inspection, the individual conductive substrates 10 or 10A are cut or otherwise removed from the workpiece sheet and are ready for incorporation into an electrochemical energy storage device. In particular, the thusly formed conductive substrates can be used to fabricate either the anode or the cathode of a primary or secondary electrochemical cell or battery.

Figure 3:
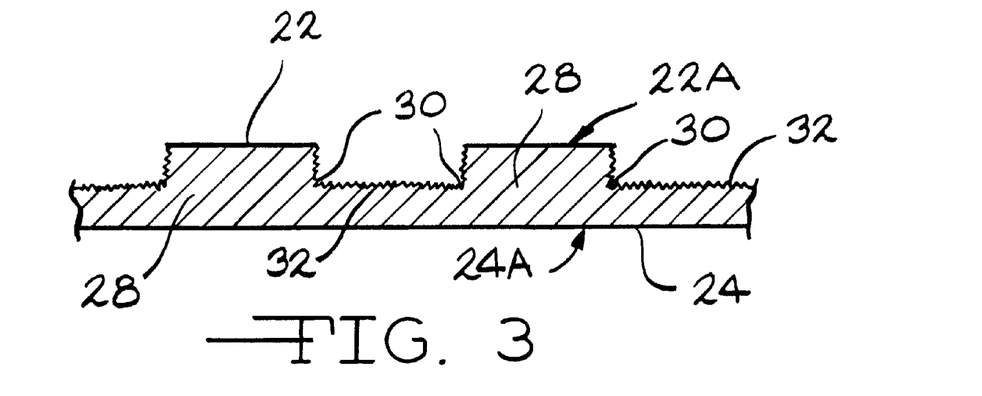
FIG. 3 is a cross-sectional view along line 3—3 of FIG. 2.
Figure 4:
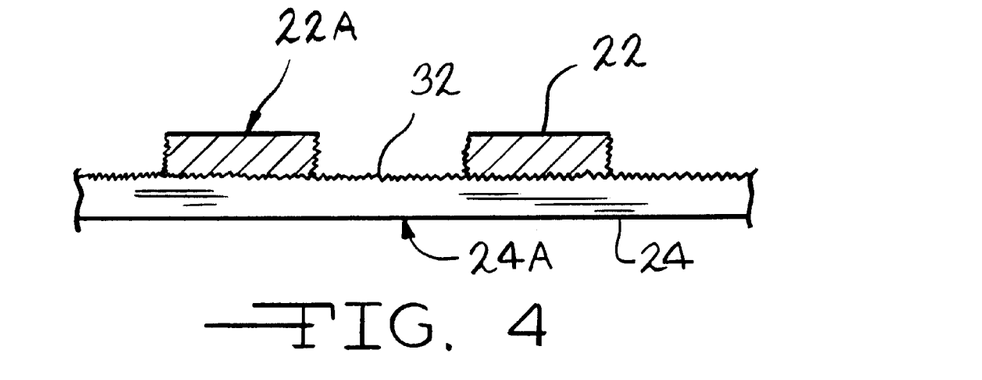
FIG. 4 is a cross-sectional view along line 4—4 of FIG. 2.

As shown in FIGS. 2 to 5, in its finished form, the conductive substrate 10 has the substantially parallel first strand structures 22 intersecting the second strand structures 24 at an angle indicated at 38 of about 90 degrees to about 15 degrees. Each of the strands 22 provide the first major surface of the conductive substrate 10 having a relatively smooth outer surface 22A extending longitudinally along the strand 22 length and joined to the frame 12 where the resist was located. The cross-sectional view of FIG. 3 shows that the outer surface 22A of the first strand 22 extends to a step 30 that meets a web 32 connecting to an adjacent step 30 and first strand portion 22. The web 32 is the inner surface of the opposite second strand 24 and has a thickness measured to the opposite outer strand surface 24A less than one-half that of the total thickness of the coil stock workpiece. Similar to that of the steps 30, the web 32 is provided with a pitted or roughened surface texture brought about by the chemical action of the etchant corroding the workpiece material in the selected areas not protected by the resist mask.

Figure 5:
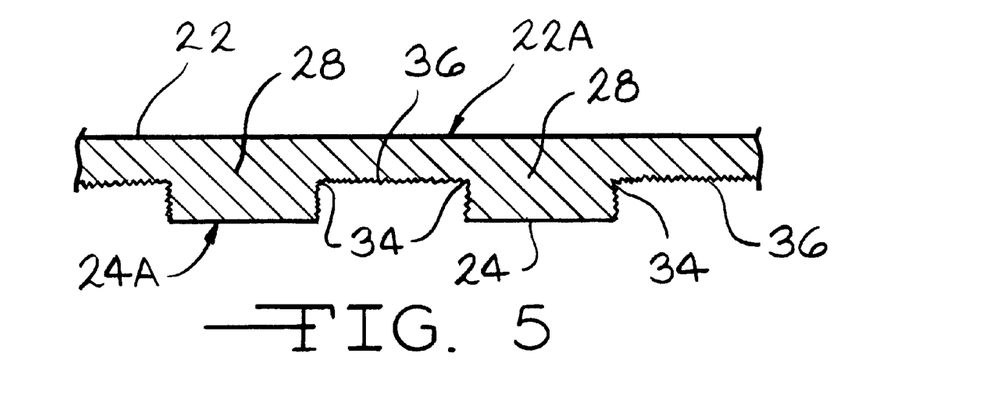
FIG. 5 is a cross-sectional view along line 5—5 of FIG. 2.
Figure 6:
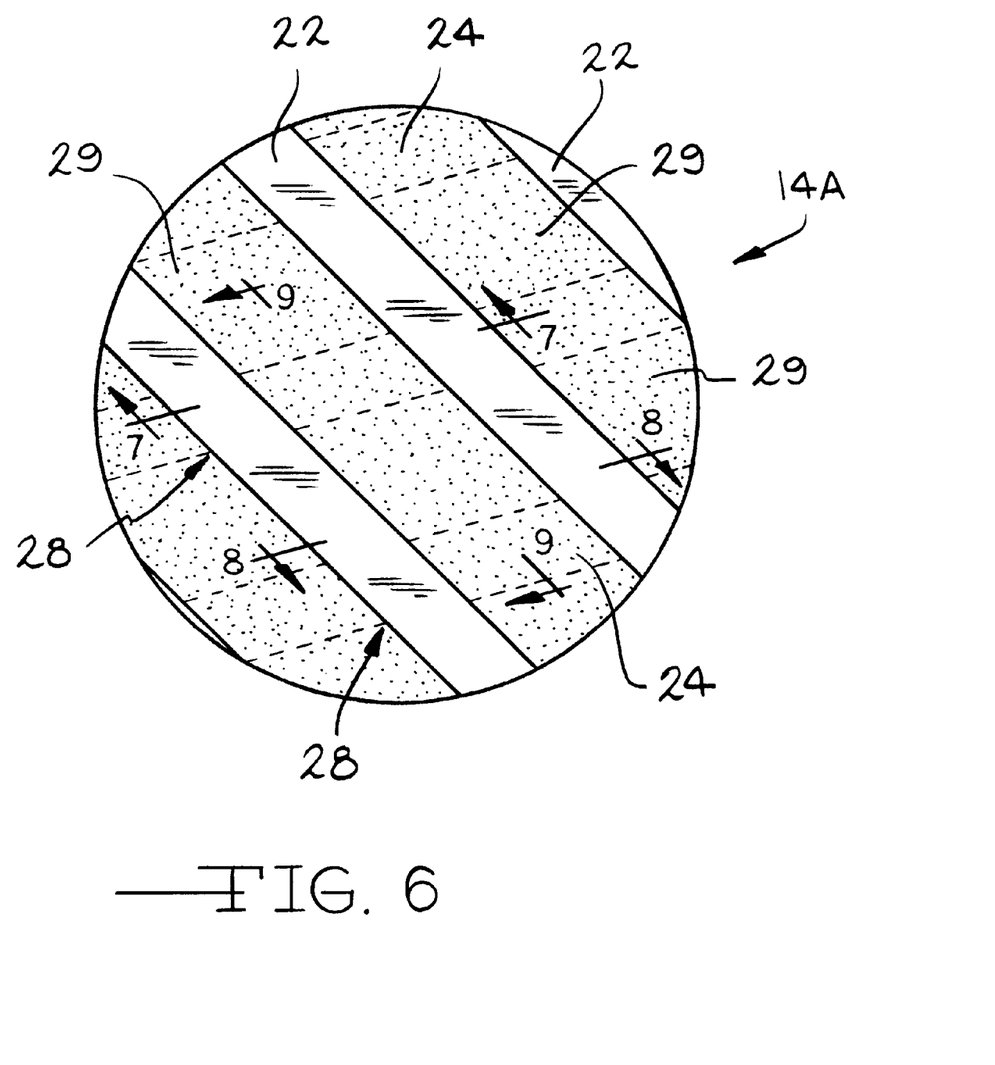
FIG. 6 is an enlarged view of another embodiment of a grid structure 14A of a conductive substrate 10A according to the present invention.
Figure 7:
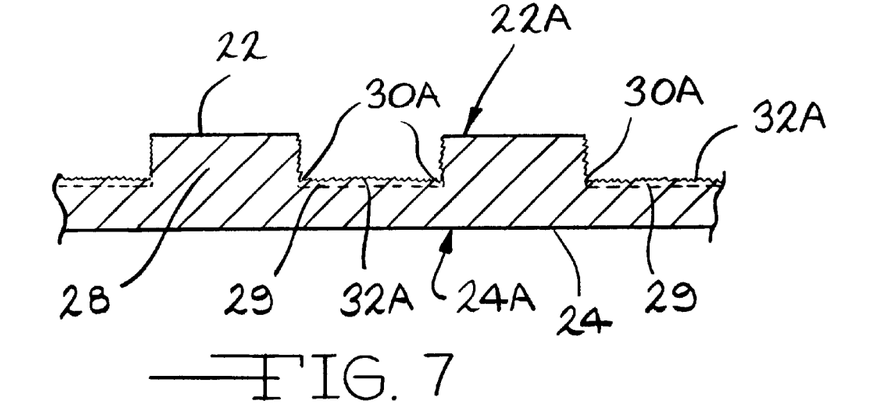
FIG. 7 is a cross-sectional view along line 7—7 of FIG. 6.

On the second, opposite major surface of the current collector 10, each of the strands 24 has a relatively smooth outer surface 24A extending longitudinally along the strand 24 length and joined to the frame 12 where the resist was located. As shown in FIG. 5, moving in a lateral direction across the short axis of any one of the strands 24, the outer surface 24A of the second strand extends to a step 34 that meets a web 36 connecting to an adjacent step 34 and second strand 24. As with web 32, web 36 is the inner surface of the opposite first strand 22 and has a thickness measured to the opposite outer strand surface 22A less than one-half that of the total thickness of the workpiece. The web 36 and steps 34 also have a pitted or roughened surface texture provided by the corrosive action of the etchant.

Figure 8:
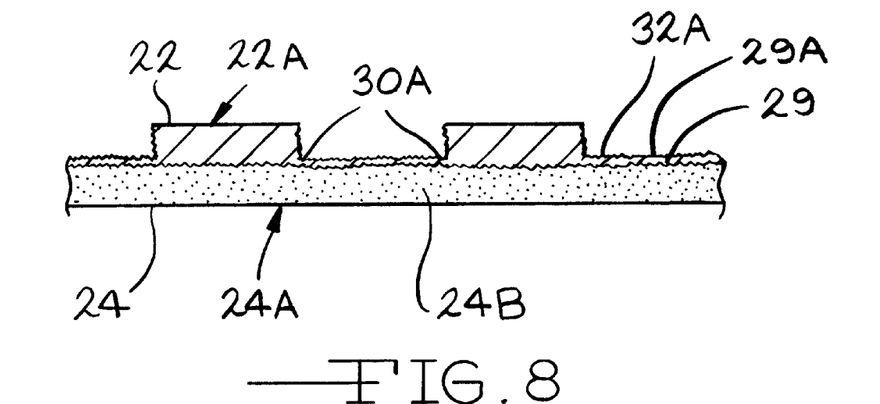
FIG. 8 is a cross-sectional view along line 8—8 of FIG. 6.
Figure 9:
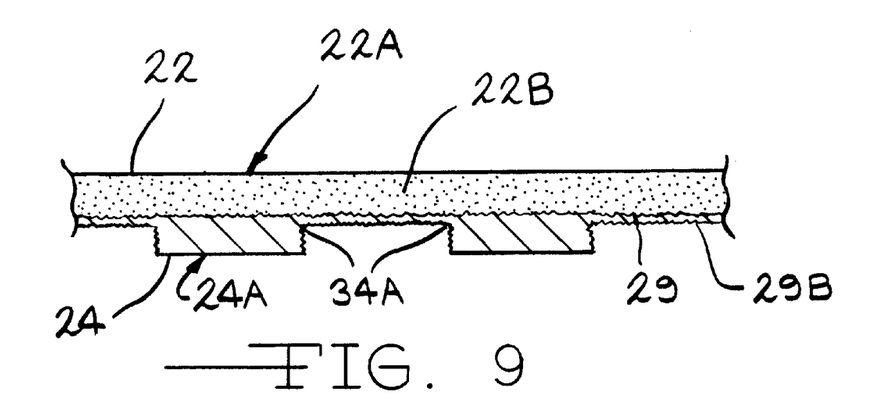
FIG. 9 is a cross-sectional view along line 9—9 of FIG. 6.

As shown in FIGS. 6 to 9, the finished conductive substrate 10A comprises the grid structure 14A having the substantially parallel first strand structures 22 intersecting the second strand structures 24 at an angle of about 90 degrees to about 15 degrees. Each of the strands provide the first major surface of the conductive substrate 10A having a relatively smooth outer surface 22A extending longitudinally along the strand 22 length and joined to the frame 12 (not shown in FIGS. 6 to 9) where the resist was located. The first strand 22 extends to the step 30A (FIG. 7) that meets a web 32A connecting to an adjacent step 30A and first strand portion 22. While not shown in the drawings, the second strand 24 similarly extends to a step 34A that meets a web 36A connecting to an adjacent step 34A and second strand portion 24. This embodiment of the present invention includes substrate portions 29 in lieu of the openings 26 of substrate 10. In particular, the cross-sectional view of FIG. 8 shows that the first strand 22 extends to a step 30A that meets a first side 29A of the substrate portion 29 connecting to an adjacent step 30A and first strand portion 22. The opposite, second side 29B of the substrate portion 29 meets the face 24B of a second strand portion 24. The cross-sectional view of FIG. 9 shows that the second strand 24 extends to a step 34A that meets the second side 29B of the substrate portion 29 connecting to an adjacent step 34A and second strand portion 24. The opposite, first side 29A of the substrate portion 29 meets a face 22B of the first strand portion 22.

Thus, those skilled in the art will realize that the selective chemical machining of the workpiece provides the conductive substrates 10 and 10A having a "basket weave" configuration provided by the intersecting strands 22,24. This construction provides for enhanced contact between the conductive substrate and the electrode active material, particularly at those locations roughened by the corrosive action of the etchant on the workpiece. Further, the chemically machined conductive substrates 10, 10A do not have burrs which can contribute to short circuit conditions, and the portions of the workpiece removed by the etchant provide for increased amounts of active materials.

Figures 10, 11, 12:
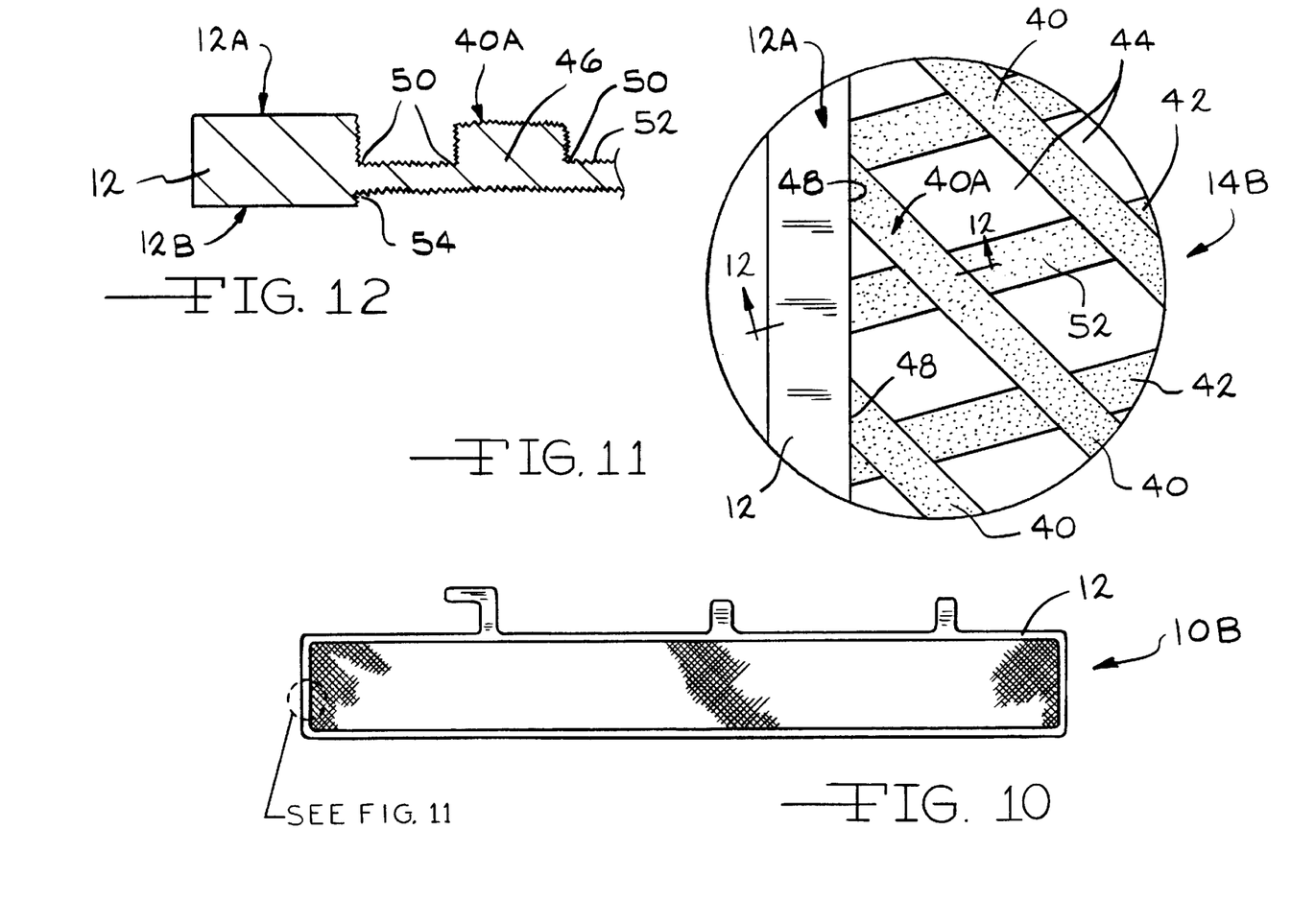
FIG. 10 is a side elevational view of another embodiment of a conductive substrate 10B according to the present invention.
FIG. 11 is an enlarged view of a portion of the grid structure 14B of the conductive substrate 10B shown in FIG. 10.
FIG. 12 is a cross-sectional view along line 12—12 of FIG. 10.

As is readily apparent from the previous description, the strands 22, 24 of substrates 10 and 10A are substantially co-planar with the respective first and second major surfaces of the frame 12. However, that is not necessary. If desired, the outer surfaces 22A, 24A of the strands 22, 24 can be recessed somewhat from the first and second major frame surfaces. Such a construction directed to another embodiment of a conductive substrate 10B according to the present invention is shown in FIGS. 10 to 12 and requires an additional masking step wherein the opposed major surfaces 12A and 12B of the frame 12 are masked first and the interior etched, followed by a second masking of the strand pattern and then etching as described above. The resulting grid structure 14B comprises first strand structures 40 intersecting second strand structures 42 to provide a plurality of diamond-shaped openings or interstices 44 bordered by the strands. The strands 40, 42 intersect or join with each other at junctions 46 thereby forming the grid structure as an integral unit.

Particularly, each of the strands 40 provide the first major surface of the conductive substrate 10B having a chemically machined, roughened outer surface 40A extending longitudinally along the strand length to a step 48 that meets the first major surface 12A of the frame 12. The cross-sectional view of FIG. 12 shows that the pitted and roughened outer surface 40A of the first strand 40 extends to a step 50 that meets a pitted and roughened web 52 connecting to an adjacent step 50 and first strand 40. The web 52 is the inner surface of the opposed, second strand 42. Similarly, each of the second strands 42 provide the second major surface of the substrate 10B having a chemically machined roughened outer surface 42A extending longitudinally along the strand length to a step 54 that meets the second major surface 12B of the frame 12. While not shown in the drawings, the pitted and roughened outer surface 42A of the second strands 42 extends to a step that meets a pitted and roughened web connecting to an adjacent step and second strand 42. Again, the web is the inner surface of the opposed, first strand 40. The construction of grid structure 14B having the chemical machined outer surfaces 40A, 42A of respective strands 40, 42 in addition to the connecting web sections provides additional treated surface area for enhanced contact to an electrode active material.

Also, while the grid structures 14, 14A and 14B are shown having the respective strand structures parallel to each other, that is not necessary. Those skilled in the art will understand that the strands need not be parallel but can have a variety of shapes including wavy, sinusoidal, concentric, zig-zag among a myriad of others. However, according to the present invention, the strands and the like are at least partially separated from each other by regions of reduced thickness such as the webs 32, 36 of substrate 10. It is also contemplated by the scope of the present invention that there can be connecting portions (not shown) extending between adjacent strands wherein the connections have an outer surface substantially co-planar to that of the side-by-side strands.

Examples of electrode active materials that may be contacted to a "basket weave" conductive substrate to provide an electrode according to the present invention include metals, metal oxides, metal sulfides and mixed metal oxides. While not necessary, the electrode active material is preferably coupled with an alkali metal anode. Such electrode active materials include silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, and other materials typically used in alkali metal electrochemical cells. Carbonaceous materials such as graphite, carbon and fluorinated carbon, which are useful in both liquid depolarizer and solid cathode primary cells and in rechargeable, secondary cells, are also useful with the present conductive substrate.

Thus, the present invention further comprises taking about 80 to about 99 weight percent of an already prepared electrode active material in a finely divided form and providing a slurry comprising the material. Prior to contact with the "basket weave" conductive substrate of the present invention, however, the finely divided electrode material is preferably mixed with up to about 10 weight percent of a binder material, preferably a thermoplastic polymeric binder material. The thermoplastic polymeric binder material is used in its broad sense and any polymeric material, preferably in a powdered form, which is inert in the cell and which passes through a thermoplastic state, whether or not it finally sets or cures, is included within the term "thermoplastic polymer". Representative materials include polyethylene, polypropylene and fluoropolymers such as fluorinated ethylene and propylene, polyvinylidene fluoride (PVDF) and polytetrafluoroethylene (PTFE), the latter material being most preferred. Natural rubbers are also useful as the binder material with the present invention.

In the case of a primary, solid cathode electrochemical cell, the cathode active material contacted to the "basket weave" conductive substrate is further combined with up to about 5 weight percent of a discharge promoter diluent such as acetylene black, carbon black and/or graphite. A preferred carbonaceous diluent is Ketjenblack® carbon. Metallic powders such as nickel, aluminum, titanium and stainless steel in powder form are also useful as conductive diluents.

Similarly, if the active material is a carbonaceous material serving as the cathode current collector in a primary, liquid depolarizer cell or a carbonaceous counterelectrode in a secondary cell, the electrode material preferably includes a conductive diluent and a binder material in a similar manner as the previously described primary, solid cathode electrochemical cell.

To form the electrode active slurry, about 94 weight percent of the cathode material, regardless of whether it is a carbonaceous material or one or more of a mixture of the other previously described cathode active materials, is combined in a twin screw mixer with a dispersion of about 0 to 3 weight percent of a conductive diluent, about 1 to 5 weight percent of a powder fluoro-resin binder and a high permittivity solvent such as a cyclic amide, a cyclic carbonate or a cyclic ester.

After mixing sufficiently to ensure that the conductive diluent and the binder material are completely dispersed throughout the admixture and to otherwise completely homogenize the various constituents, the electrode admixture is removed from the mixer as a slurry containing about 14% solids, by volume. The step of subjecting the electrode admixture to the mixer to form the slurry can also include the addition of a liquid electrolyte. The electrode admixture slurry has a dough-like consistency and is preferably contacted onto the opposed sides of the "basket weave" conductive substrate of the present invention.

The thusly formed cathode laminate is heated to a temperature of between about 80° C. to about 130° C. and more preferably to about 110° C., for a period of about 30 minutes to about 60 minutes. The heating step is preferably carried out under vacuum and serves to remove any residual solvent from the cathode material. Heating further serves to plasticize the binder material to ensure the structural integrity of the newly manufactured electrode laminate. The electrode laminate can then be stored for later use, or is immediately useable in an electrochemical cell. After drying to remove all residual water from the slurry contacted to the conductive substrate, the resulting anhydrous active admixture is calendared under a pressure of about 40 tons/inch$^2$ to laminate the active admixture to the "basket weave" conductive substrate of the present invention.

An alternate preferred method for providing an electrode is to form the blended electrode active admixture into a free-standing sheet prior to being contacted to the present "basket weave" conductive substrate. One preferred method of preparing a cathode material into a free-standing sheet is thoroughly described in U.S. Pat. No. 5,435,874 to Takeuchi et al., which is assigned to the assignee of the present invention and incorporated herein by reference. Other techniques for contacting the active material to the conductive substrate includes rolling, spreading or pressing the admixture thereto.

Cathodes prepared as described above are flexible and may be in the form of one or more plates operatively associated with at least one or more plates of anode material, or in the form of a strip wound with a corresponding strip of anode material in a structure similar to a "jellyroll".

The anode is of a metal selected from Group IA, IIA or IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium, and the more preferred anode comprises a lithium alloy such as a lithium-aluminum alloy. However, the greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. Preferably, the anode current collector is of the present "basket weave" construction. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

An electrochemical cell having an alkali metal-containing electrode serving as an alkali metal anode, or an alkalated cathode body and a carbonaceous counterelectrode according to the present invention further includes a separator provided therebetween. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidene fluoride, polyethylenetetrafluoroethylene, and polyethylenechlorotrifluoroethylene used either alone or laminated with a fluoropolymeric microporous film. Other suitable separator materials include non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

Suitable nonaqueous electrolyte solutions that are useful in both primary and secondary cells having an alkali metal electrode and a counterelectrode of a solid material contacted to a "basket weave" conductive substrate preferably comprise a combination of a lithium salt and an organic solvent system. More preferably, the electrolyte includes an ionizable alkali metal salt dissolved in an aprotic organic solvent or a mixture of solvents comprising a low viscosity solvent and a high permittivity solvent. The inorganic, tonically conductive salt serves as the vehicle for migration of the alkali metal ions to intercalate into the carbonaceous material. Preferably the ion-forming alkali metal salt is similar to the alkali metal comprising the anode. Suitable salts include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, LISCN, $LiO_3SCF_2CF_3$, $LiC_6F_5SO_3$, $LiO_2CCF_3$, $LiSO_3F$, $LiB(C_6H_5)_4$ and $LiCF_3SO_3$, mixtures thereof. Suitable salt concentrations typically range between about 0.8 to 1.5 molar.

In a liquid depolarizer/catholyte cell, suitable active materials such as sulfur dioxide or oxyhalides including phosphoryl chloride, thionyl chloride and sulfuryl chloride are used individually or in combination with each other or in combination with halogens and interhalogens, such as bromine trifluoride, or other electrochemical promoters or stabilizers.

In other electrochemical systems having a solid cathode or in secondary cells, the nonaqueous solvent system comprises low viscosity solvents including tetrahydrofuran (THF), methyl acetate (MA), diglyme, trigylme, tetragylme, dimethyl carbonate (DMC), ethyl methyl carbonate (EMC), 1,2-dimethoxyethane (DME), diisopropylether, 1,2-diethoxyethane, 1-ethoxy, 2-methoxyethane, dipropyl carbonate, ethyl methyl carbonate, methyl propyl carbonate, ethyl propyl carbonate and diethyl carbonate, and mixtures thereof, and high permittivity solvents include cyclic carbonates, cylic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone and N-methyl-pyrrolidinone (NMP), and mixtures thereof. In the present invention, the preferred alkali metal is lithium metal. For a solid cathode, primary cell and a secondary cell, the preferred electrolyte is $LiAsF_6$ or $LiPF_6$ in a 50:50, by volume, mixture of PC/DME. For a liquid depolarizer cell, the preferred electrolyte is 1.0M to 1.4M $LiBF_4$ in T-butyrolactone (GBL).

The preferred form of a primary alkali metal/solid cathode electrochemical cell is a case-negative design wherein the anode is in contact with a conductive metal casing and the cathode contacted to the "basket weave" conductive substrate serving as the current collector according to the present invention is the positive terminal. In a secondary electrochemical cell having a case-negative configuration, the anode (counterelectrode)/cathode couple is inserted into the conductive metal casing such that the casing is connected to the carbonaceous counterelectrode "basket weave" current collector according to the present invention, and the lithiated material is contacted to a second current collector, which also preferably has the "basket weave" configuration. In either case, the current collector for the lithiated material or the cathode electrode is in contact with the positive terminal pin via a lead of the same material as the current collector which is welded to both the current collector and the positive terminal pin for electrical contact.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counterelectrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of an electrochemical cell according to the present invention, and set forth the best mode contemplated by the inventors of carrying out the invention, but are not construed as limiting.

EXAMPLE 1

Lithium anode material was pressed on nickel current collector screen and a cathode admixture comprising, by weight, 94% silver vanadium oxide mixed with 3% TEFLON 7A®, 2% graphite and 1% carbon black was prepared. The cathode mix was pressed on a flat etched current collector according to the prior art, and a "basket weave" current collector according to the present invention. The basket weave current collector consisted of a diamond design similar to that shown in FIG. 2 wherein the short axis or height of the diamond was about 0.036 inches. The cathode current collector material was titanium. The prior art flat etched current collector was provided by contacting a planar, titanium substrate with an acid solution to increase the contact surface area of the current collector.

Three cells having a prismatic cell stack assembly configuration were constructed incorporating the prior art (flat etched) cathode and three cells having the present invention (basket weave) cathode associated with the anode in a jellyroll electrode configuration were built. In both cell constructions, two layers of microporous membrane polypropylene separator were sandwiched between the anode and cathode. The electrode assemblies were then hermetically sealed in a stainless steel casing in a case-negative configuration. The cells were activated with the electrolyte consisting of 1.0M $LiAsF_6$ dissolved in a 50:50, by volume, mixture of PC and DME with dibenzyl carbonate (DBC) and benzyl-N-succinimidyl carbonate (BSC), at a concentration of about 0.05M and 0.005M, respectively, added therein.

A constant resistive load of 2.49 kΩ was applied to the cells for 17 hours during an initial predischarge burn-in period. The predischarge period is referred to as burn-in and depleted the cells of approximately 1% of their theoretical capacity. Following burn-in, the cells were subjected to acceptance pulse testing consisting of four 10 second pulses 1.3 amp (19.0 mA/cm$^2$) with a 15 second rest between each pulse.

Following acceptance pulse testing, the cells were subjected to accelerated pulse testing comprising being discharged under a constant resistance (14.7 kg) background load at 37° C. with superimposed pulse trains. In particular, each train was applied every 38 days and consisted of a 1.3 amp (19.0 mA/cm$^2$) pulse train of four pulses of ten seconds duration with 15 seconds rest between each pulse.

Figure 13:
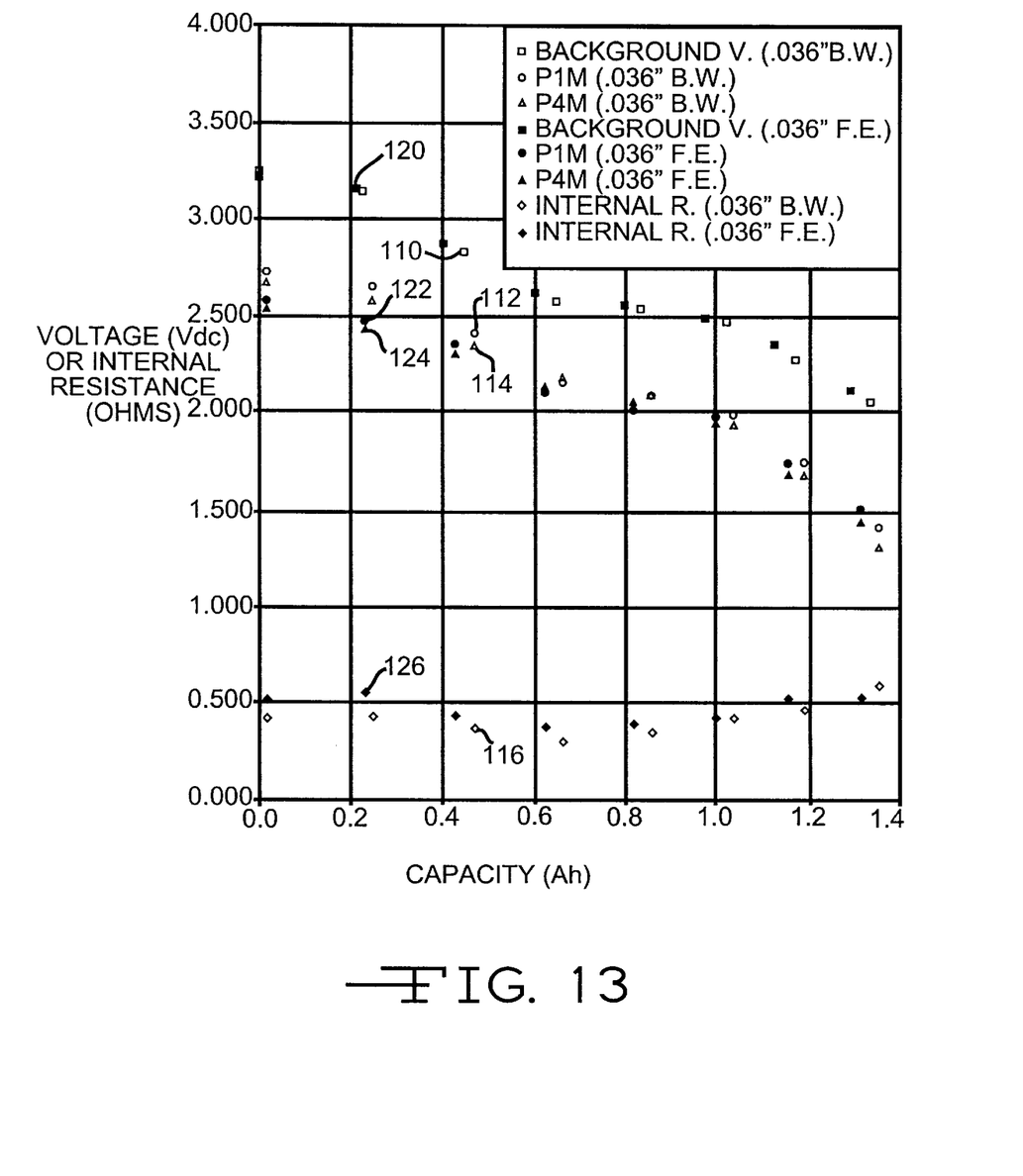
FIG. 13 is a graph constructed from the pulse discharge of competing lithium/silver vanadium oxide cells, one having a flat etched cathode current collector according to the prior art in comparison to a similar cell constructed with a "basket weave" cathode current collector according to the present invention.

The average discharge readings for the depth-of-discharge, pre-pulse potentials, pulse 1 and 4 minimum potentials and internal resistance (DOD) during accelerated pulse discharge testing are summarized in Tables 1 and 2 for the present invention cells (basket weave, jellyroll and thee configuration) and the prior art cells (flat etched, jellyroll electrode configuration), respectively. The results are also graphed in FIG. 13. In particular, curve 110 was constructed from the average pre-pulse voltage of the present invention cells, curves 112 and 114 were constructed from the average pulse 1 and pulse 4 minimum voltages, respectively, and curve 116 is the average internal resistance of those cells. In contrast, curve 120 was constructed from the average pre-pulse voltage of the prior art cells, curves 122 and 124 were constructed from the average pulse 1 and pulse 4 minimum voltages, respectively, and curve 126 was constructed from the average internal resistance of those cells.

TABLE 1

| DOD (Avg.) | P pre 1 | P1 min. (V) | P4 min. (V) | Internal Resistance (Ω) |
|---|---|---|---|---|
| 0.000 | 3.230 | | | |
| 0.020 | | 2.726 | 2.678 | 0.424 |
| 0.227 | 3.142 | | | |
| 0.247 | | 2.653 | 2.585 | 0.428 |
| 0.447 | 2.832 | | | |
| 0.471 | | 2.411 | 2.354 | 0.368 |
| 0.649 | 2.575 | | | |
| 0.663 | | 2.156 | 2.187 | 0.298 |
| 0.834 | 2.539 | | | |
| 0.857 | | 2.084 | 2.092 | 0.344 |
| 1.021 | 2.471 | | | |
| 1.036 | | 1.982 | 1.932 | 0.414 |
| 1.171 | 2.272 | | | |
| 1.189 | | 1.742 | 1.681 | 0.455 |
| 1.336 | 2.051 | | | |
| 1.354 | | 1.408 | 1.301 | 0.577 |

TABLE 2

| DOD (Avg.) | P pre 1 | P1 min. (V) | P4 min. (V) | Internal Resistance (Ω) |
|---|---|---|---|---|
| 0.000 | 3.221 | | | |
| 0.020 | | 2.582 | 2.543 | 0.522 |
| 0.211 | 3.158 | | | |
| 0.231 | | 2.472 | 2.439 | 0.553 |
| 0.404 | 2.873 | | | |
| 0.428 | | 2.356 | 2.308 | 0.435 |
| 0.603 | 2.622 | | | |
| 0.624 | | 2.101 | 2.135 | 0.374 |
| 0.799 | 2.557 | | | |
| 0.818 | | 2.007 | 2.053 | 0.388 |
| 0.976 | 2.489 | | | |
| 0.997 | | 1.971 | 1.947 | 0.417 |
| 1.126 | 2.355 | | | |
| 1.153 | | 1.738 | 1.684 | 0.516 |
| 1.293 | 2.113 | | | |
| 1.314 | | 1.506 | 1.438 | 0.519 |

Thus, the improved intimate contact afforded by the basket weave cathode current collector of the present invention enables the construction of lithium/silver vanadium oxide cells having a jellyroll electrode configuration in comparison to the prior art prismatic cells of a similar chemistry. The jellyroll cell stack with the basket weave cathode current collector configuration in turn results in higher voltage minimums under pulse discharge, which reduces voltage recovery back to pre-pulse levels and provides for increased energy utilization efficiency, thereby extending the medical device life powered by the present invention cell. The cells built according to the present invention also exhibit reduced internal resistances, in part, brought about by the jellyroll configuration which requires less electrode leads, especially for the cathode, than the prismatic design. Fewer electrode leads facilitates cell manufacturability by eliminating additional joining operation while enhancing cell reliability.

It is appreciated that various modifications to the inventive concepts described herein may be apparent to those skilled in the art without departing from the spirit and the scope of the present invention defined by the hereinafter appended claims.

What is claimed is:

1. A current collector, which comprises:

a) a frame having a frame thickness defined by spaced apart first and second major surfaces of the current collector;

b) at least two first structures extending to and meeting with the frame, wherein the first structures have a first length extending to spaced apart first and second end portions joined to the frame at first and second frame locations, and wherein an outer surface of the first structures is substantially co-planar with the first major surface of the frame;

c) at least two second structures extending to and meeting with the frame, wherein the second structures have a second length extending to spaced apart third and fourth end portions joined to the frame at third and fourth frame locations, and wherein an outer surface of the second structures is substantially co-planar with the second major surface of the frame, and wherein a thickness of the first and second structures is less than the frame thickness and wherein the at least two first structures are continuous with the at least two second structures at a junction location along the first length intermediate the first and second frame location and along the second length intermediate the third and fourth frame locations where the first structures intersect the second structures; and d) subtrate portions bordered by at least some of the first and second structures and bordered by the frame and at least some of the first and second structures, wherein a thickness of the substrate portions is less than the thickness of the first and second structures.

2. The current collector of claim 1 wherein there are a plurality of first structures comprised of an array of substantially parallel first strands extending to and meeting with opposed portions of the frame at the first and second frame locations and a plurality of second structures comprised of an array of substantially parallel second strands extending to and meeting with opposed portions of the frame at the third and fourth frame locations.

3. The current collector of claim 1 wherein the outer surfaces of the first and second structures have a relatively smooth texture.

4. The current collector of claim 1 wherein the frame thickness is about 0.001 to about 2 millimeters.

5. The current collector of claim 1 including at least one tab extending therefrom.

6. An electrochemical cell having a first electrode comprising an alkali metal; a second electrode comprising an electrode material; and an electrolyte activating the first and second electrodes, the improvement in the cell comprising; at least one of the elsecrodes supported on a conductive substrate, which comprises:
   a) a frame having a frame thickness defined by spaced apart first and second major surface of the conductive substrate;
   b) a first array of first strands extending to and meeting with the frame, wherein each of the first strands has a first length extending to spaced apart first and second end portions joined to the frame at first and second frame locations, and wherein an outer surface of the first strands is substantially co-planar with the first major surface of the frame;
   c) a second array of second strands extending to and meeting with the frame, wherein each of the second strands has a second length extending to spaced apart third and fourth end portions joined to the frame at third and fourth frame locations, and wherein an outer surface of the second strands is substantially co-planar with the second major surface of the frame, and wherein a thickness of the first and second strands is less than the frame thickness and wherein the first strands are continuous with the second strands at a junction location along the first length intermediate the first and second frame locations and along the second length intermediate the third and fourth frame locations where the first strands intersect the second strands; and
   d) substrate portions bordered by at least some of the first and second strands and bordered by the frame and at least some of the first and second strands, wherein a thickness of the substrate portions is less than the thickness of the first and second strands.

7. The electrochemical cell of claim 6 wherein the junction of the first strands continuous with the second strands is bisected by the midpoint of the frame.

8. The electrochemical cell of claim 6 wherein the electrolyte includes a first solvent selected from the group consisting of tetrahydrofuran, methyl acetate, diglyme, triglyme, tetraglyme, 1,2-dimethoxyethane, diisopropylether, 1,2-diethoxyethane, 1-ethoxy, 2-methoxyethane, dimethyl carbonate, diethyl carbonate, dipropyl carbonate, ethyl methyl carbonate, methyl propyl carbonate and ethyl propyl carbonate, and mixtures thereof.

9. The electrochemical cell of claim 6 wherein the electrolyte includes a second solvent selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone and N-methyl-pyrrolidinone, and mixtures thereof.

10. The electrochemical cell of claim 6 wherein electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

11. The electrochemical cell of claim 6 wherein the alkali metal is comprised of lithium or a lithium-aluminum alloy.

12. The electrochemical cell of claim 6 wherein the electrode material is selected from the group consisting of silver vanadium oxide, copper silver vanadium oxide, copper vanadium oxide, vanadium oxide, manganese dioxide, titanium disulfide, copper oxide, copper sulfide, iron sulfide, iron disulfide, cobalt oxide, nickel oxide, graphite, carbon and fluorinated carbon and mixtures thereof.

13. The electrochemical cell of claim 6 wherein the second electrode is a cathode and comprises from about 80 to about 99 weight percent of cathode active material.

14. The electrochemical cell of claim 13 wherein the cathode further comprises a binder material and a conductive additive.

15. The electrochemical cell of claim 14 wherein the binder material is a fluoro-resin powder.

16. The electrochemical cell of claim 14 wherein the conductive additive is selected from the group consisting of carbon, graphite powder and acetylene black and metallic powder selected from the group consisting of titanium, aluminum, nickel and stainless steel, and mixtures thereof.

17. The electrochemical cell of claim 6 wherein the cathode comprises from about 0 to 3 weight percent carbon, about 1 to 5 weight percent of a powder fluoro-resin and about 94 weight percent of the cathode active material.

18. The electrochemical cell of claim 6 wherein the conductive substrate is selected from the group consisting of titanium, molybdenum, tantalum, niobium, cobalt, nickel, stainless steel, tungsten, platinum, palladium, gold, silver, copper, chromium, vanadium, aluminum, zirconium, hafnium, zinc and iron, and mixtures and alloys thereof.

19. The electrochemical cell of claim 6 wherein the cell is either a primary or a secondary cell.

20. The electrochemical cell of claim 6 wherein the anode and the cathode are in operative association with each other in a jellyroll electrode configuration.

21. A current collector, which comprises:
   a) a frame having a frame thickness defined by spaced apart first and second major surfaces of the current collector;
   b) first structures extending to and meeting with the frame, wherein an inner surface of the first structures is disposed from a midpoint of the frame thickness to the second major surface of the frame;
   c) second structures extending to and meeting with the frame, wherein an inner surface of the second structures is disposed from the midpoint of the frame thickness to the first major surface of the frame, and wherein the first structures are continuous with the second structures at a junction location interior of the frame where the first structures intersect the second structures; and
   d) substrate portions bordered by at least some of the first and second structures and bordered by the frame and at least some of the first and second structures, wherein a thickness of the substrate portions is less than the thickness of the first and second structures.

22. The current collector of claim 21 wherein the junction of the first structures intersecting the second structures is bisected by the midpoint of the frame.

23. The current collector of claim 21 wherein the thickness of the first and second structures is greater than half that of the frame thickness.

24. The current collector of claim 21 wherein a web portion of the second structures extending to and meeting with the first structures has a roughened texture, and wherein a web portion of the first structures extending to and meeting with the second structures has a roughened texture, and wherein the roughened texture of the web portions is characterized as having been provided by contact of the current collector with an etchant material.

25. The current collector of claim 21 wherein an angle at the junction of the first and second structures ranges from 90° to about 15°.

26. The electrochemical cell of claim 21 wherein the inner surface of the first structures has a roughened textures, and the inner surface of the second structures has a roughened texture.

\* \* \* \* \*

UNITED STATES PATENT AND TRADEMARK OFFICE
CERTIFICATE OF CORRECTION

PATENT NO. : 6,110,622
DATED : Aug. 29, 2000
INVENTOR(S) : Frysz et al.

It is certified that error appears in the above-identified patent and that said Letters Patent is hereby corrected as shown below:

Col. 9, line 65 - "T-butyrolactone" should be -- $\gamma$-butyrolactone --.

Col. 12, line 57 - "location" should be -- locations --.

Col. 13, line 20 - "surface" should be -- surfaces --.

Signed and Sealed this

Fifteenth Day of May, 2001

Attest:

NICHOLAS P. GODICI

*Attesting Officer*  *Acting Director of the United States Patent and Trademark Office*